V. M. CHAFFEE.
Reaping Machine.
No. 27,523.
Patented March 20, 1860.
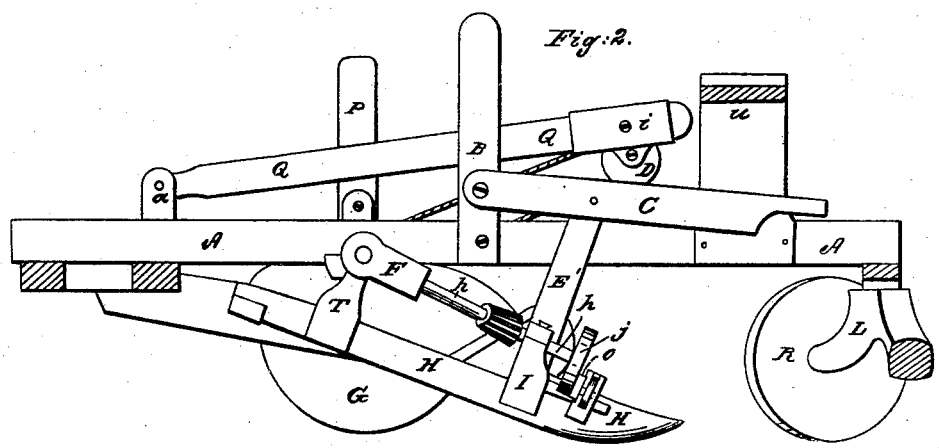
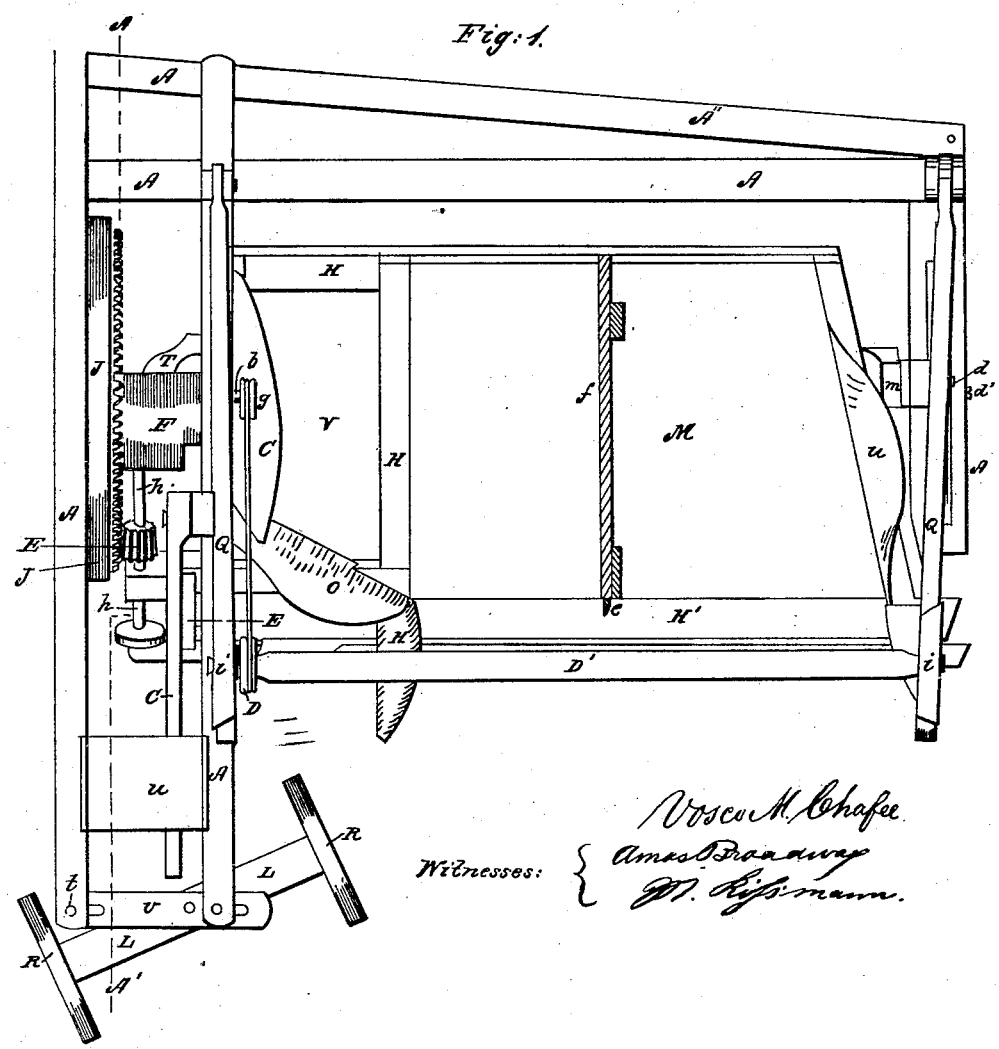

UNITED STATES PATENT OFFICE.

VOSCO M. CHAFEE, OF XENIA, ILLINOIS.

IMPROVEMENT IN MOWING AND REAPING MACHINES.

Specification forming part of Letters Patent No. 27,523, dated March 20, 1860.

*To all whom it may concern:*

Be it known that I, VOSCO M. CHAFEE, of Xenia, in the county of Clay and State of Illinois, have invented certain new and useful Improvements in Reaping and Mowing Machines; and I do hereby declare that the following is a full, clear, and exact description of the same, reference being had to the annexed drawings, making part of this specification, in which—

Figure 1 is a plan or top view, and Fig. 2 a vertical section through A' A'.

To enable others skilled in the arts to which this appertains to make and use my invention, I will proceed to describe the construction and operation thereof.

Similar letters of reference represent corresponding parts of the different figures of the drawings annexed.

A is the frame of the machine, which may be made of the form shown by the drawings, or of such other form as will best fill the conditions of strength and convenience. The frame is mounted upon a pair of wheels, (shown at J and G.) The axis of the wheel J is shown at $b$, and the axis of the wheel G is shown at $d'$, Fig. 1. The wheel J is the driving-wheel, and the wheel G is a mere truck-wheel to support the outside end of the platform or frame.

Q Q are two radial bars, the lower ends of which are hinged to upright posts $a$, which are bolted or mortised in the frame. The altitude of these bars is regulated by means of pins through the post B, and the use of them is to support the reel, the axle of which is shown at D'. The ends of this axle are supported in suitable journal-boxes, $i$, which are made to lap over the said bars, and are so arranged as to slide up and down on them by means of a bolt which passes through the upper part of the boxes and a slot cut in the bars, whereby the box may be adjusted to any given position.

H H' is the frame of the platform, and M is the center thereof; and $f$ shows a section through the said platform, and $e$ a pin whereby the front of the said platform is secured in the frame-piece H'.

V is an open space in the rear end of the platform, through which the grain is raked from the platform on the ground.

O'' O' are fenders to keep the grain from becoming entangled in the machinery, as is also W.

L L is an axle, upon which are two wheels, R R. This axle vibrates freely about a center, (shown in the cross-piece $v$,) and to this axle the motive power is applied, and by it the machine is guided in the required direction. The cross-piece $v$ is fixed to the frame A by means of bolts $t\ t$, which pass through slots in the said cross-piece, whereby the said axle may be moved to or from the platform, whereby the side draft is increased or diminished, as the axle is moved to or from the platform F; and $m$ are center-pieces, which vibrate around the two centers $b$ and $d$, and to which the platform is attached by means of the arm T, which is attached to or may be made a part of the center-piece. The front part of the platform is attached to the link E', which is secured to the lever $c$, which communicates with the driver's seat $u$, which thus enables the driver to raise or lower the platform at an instant's notice, thus enabling him to clear stumps or other obstructions that may be in the way. $h$ is a shaft which has one of its journals in the center-piece F and the other in the plumber-block I. Upon this shaft a pinion, E, is fixed, which meshes in the cogs on the face of the driving-wheel J, whereby the knives are put in operation through the medium of the crank-wheel $j$, the knife-rod being connected at $o$.

Having thus described my invention, I would state that I do not claim raising and lowering the platform, broadly, as that is done in a variety of machines. Neither do I claim making the platform so that it can be raised and lowered without affecting the position of the frame as such; but

What I do claim is—

Arranging the platform in the frame in the manner I have described and hanging it upon the center or axle of the driving-wheel J and a corresponding center, $m$, in the frame by means of the arms T and $m$, and in making the arm T a part of the center-piece F, wherein the one end of the shaft $h$ has its journal, so that the arm T, the shaft $h$, and the platform H shall all vibrate together about the same center, and these I claim only when the whole is arranged substantially as herein described.

VOSCO M. CHAFEE.

Witnesses:
AMOS BROADNAX,
M. KISSMANN.